United States Patent
Beattie et al.

(10) Patent No.: US 10,702,064 B1
(45) Date of Patent: Jul. 7, 2020

(54) MOBILE PLATFORM AND RELATED METHODS

(71) Applicant: MOBILITY TRANSFER EXPERTS, LLC., Phoenix, AZ (US)

(72) Inventors: Glenn Beattie, Phoenix, AZ (US); John Cantone, Phoenix, AZ (US)

(73) Assignee: Mobility Transfer Experts, LLC, Phoenix, AZ (US)

( * ) Notice: Subject to any disclaimer, the term of this patent is extended or adjusted under 35 U.S.C. 154(b) by 46 days.

(21) Appl. No.: 15/620,045

(22) Filed: Jun. 12, 2017

(51) Int. Cl.
| | | |
|---|---|---|
| A47B 91/00 | (2006.01) | |
| A47C 7/62 | (2006.01) | |
| F16M 13/00 | (2006.01) | |
| A61G 5/10 | (2006.01) | |

(52) U.S. Cl.
CPC .............. *A47B 91/005* (2013.01); *A47C 7/62* (2013.01); *A61G 5/1056* (2013.01); *F16M 13/00* (2013.01); *A61G 2203/12* (2013.01); *F16M 2200/08* (2013.01)

(58) Field of Classification Search
CPC ...... A47B 91/005; A47C 7/62; A47G 5/1056; F16M 13/00; F16M 2200/08; A61G 5/1056
USPC ............... 108/54.1; 297/217.1; 4/560.1, 480, 4/571.1; 5/81.1 R, 81.1 HS; 248/346.01, 248/346.07, 424, 429, 430
See application file for complete search history.

(56) References Cited

U.S. PATENT DOCUMENTS

| | | | |
|---|---|---|---|
| 3,271,785 A | | 9/1966 | Du Bose |
| 3,341,864 A | * | 9/1967 | Wichmann ........... A61G 5/1002 297/118 |
| 4,266,305 A | | 5/1981 | Kavaloski |
| 4,278,387 A | * | 7/1981 | Seguela .................... A61G 3/06 414/462 |
| 4,888,833 A | | 12/1989 | Garcia |
| 4,919,384 A | * | 4/1990 | Grimberg ............. B23Q 9/0014 248/646 |
| 4,920,587 A | | 5/1990 | Kerr |
| 5,184,653 A | | 2/1993 | Lacy |
| 5,373,591 A | | 12/1994 | Myers |

(Continued)

FOREIGN PATENT DOCUMENTS

CN 203280323 11/2013

OTHER PUBLICATIONS

Eagle Health Supply Toilet to Tub Sliding Transfer Bench, Eagle Health, available at https://www.amazon.com/Eagle-Health-Supply-Sliding-Transfer/dp/B00847FYE8, accessed Apr. 27, 2017.

*Primary Examiner* — Jose V Chen
(74) *Attorney, Agent, or Firm* — Adam R. Stephenson, LTD.

(57) ABSTRACT

Implementations of mobile platforms for assisting a person with a physical disability may include a base coupled to a motor and a deck coupled to a base, wherein the motor is configured to move the deck along the base. The mobile platform may also include a controller coupled with the motor that is configured to direct the motor that moves the deck over the base to a first position to allow a user to sit on a first seating device resting on the deck and to direct the movement of the deck to a second position different from the first position to allow a user to sit on a second seating device resting on the deck, wherein the first seating device and the second seating device are each configured to seat a human.

17 Claims, 7 Drawing Sheets

(56) References Cited

U.S. PATENT DOCUMENTS

| | | | | |
|---|---|---|---|---|
| 5,517,704 A * | 5/1996 | Dagostino | | A47K 3/122 |
| | | | | 4/480 |
| 5,636,399 A * | 6/1997 | Tremblay | | A61G 3/061 |
| | | | | 14/71.1 |
| 5,711,505 A * | 1/1998 | Nemoto | | B60N 2/01516 |
| | | | | 248/424 |
| 5,832,555 A * | 11/1998 | Saucier | | A61G 3/061 |
| | | | | 14/71.1 |
| 6,256,806 B1 | 7/2001 | Ditommaso | | |
| 6,264,416 B1 * | 7/2001 | Eaton, Jr. | | B60P 1/431 |
| | | | | 14/71.1 |
| 6,418,571 B1 | 7/2002 | Cheng | | |
| 6,567,997 B2 * | 5/2003 | Harper | | A61G 7/053 |
| | | | | 297/217.7 |
| 6,643,869 B1 | 11/2003 | Sloan | | |
| 7,039,964 B2 | 5/2006 | Cavanagh | | |
| 7,107,630 B2 * | 9/2006 | Noro | | A47K 3/007 |
| | | | | 4/540 |
| 7,675,742 B2 * | 3/2010 | Wu | | G06F 1/16 |
| | | | | 211/134 |
| 7,690,055 B2 * | 4/2010 | Hammer | | A61G 7/1003 |
| | | | | 4/560.1 |
| 7,735,162 B2 | 6/2010 | Ringholz | | |
| 8,517,414 B2 * | 8/2013 | Goldstein | | A61G 5/1002 |
| | | | | 280/304.1 |
| 8,534,979 B2 * | 9/2013 | Hansen | | A61G 3/061 |
| | | | | 414/537 |
| 9,009,886 B2 | 4/2015 | Hjort | | |
| D768,950 S * | 10/2016 | McKeon | | D34/28 |
| 9,510,984 B1 | 12/2016 | Mackenzie | | |
| 2007/0023604 A1 * | 2/2007 | Chou | | B23Q 3/00 |
| | | | | 248/424 |
| 2008/0141446 A1 | 6/2008 | Dupois | | |
| 2008/0185885 A1 * | 8/2008 | Graham | | A61G 5/045 |
| | | | | 297/217.3 |
| 2010/0117411 A1 * | 5/2010 | Fujita | | A61B 5/0205 |
| | | | | 297/217.1 |
| 2014/0042727 A1 | 2/2014 | Musham | | |
| 2015/0152656 A1 * | 6/2015 | Mckeon | | E04G 21/166 |
| | | | | 414/800 |

* cited by examiner

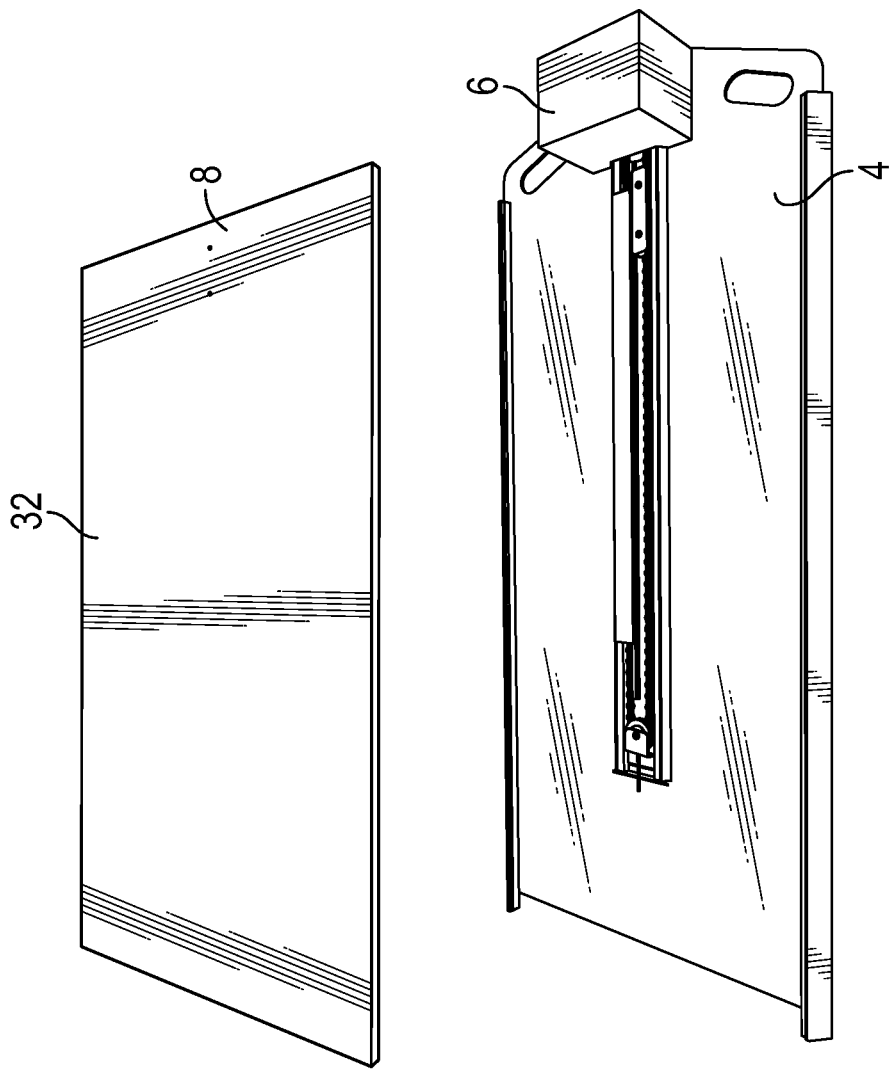
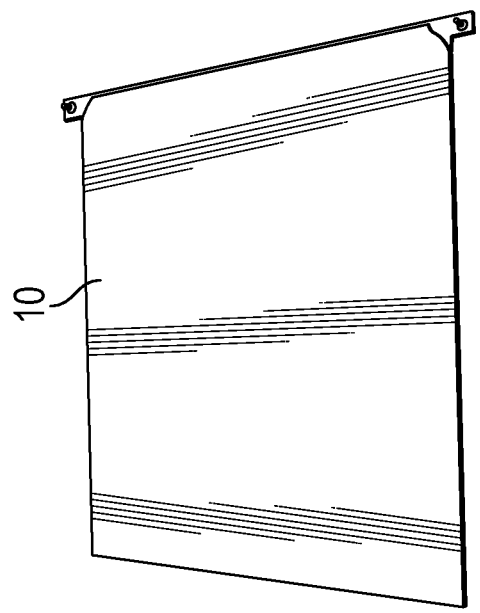
FIG. 2

MOBILE PLATFORM AND RELATED METHODS

BACKGROUND

1. Technical Field

Aspects of this document relate generally to devices to assist people with physical disabilities. More specific implementations involve devices to assist people who struggle walking or are unable to walk.

2. Background

Devices have been created to help physically disabled people who struggle too or are no longer able to walk. Such devices range from wheelchairs to crutches to prosthetics. These devices are common in the field of geriatrics as individuals often lose mobility in the later years of life. Specifically, home health care devices that allow the individual to function at home are important to help elderly individuals stay in their homes as long as possible rather than moving to a rest home.

SUMMARY

Implementations of mobile platforms for assisting a person with a physical disability may include a base coupled to a motor and a deck coupled to a base, wherein the motor is configured to move the deck along the base. The mobile platform may also include a controller coupled with the motor that is configured to direct the motor that moves the deck over the base to a first position to allow a user to sit on a first seating device resting on the deck and to direct the movement of the deck to a second position different from the first position to allow a user to sit on a second seating device resting on the deck, wherein the first seating device and the second seating device are each configured to seat a human.

Implementations of mobile platforms for assisting a person with a physical disability may include one, all, or any of the following:

The first seating device and the second seating device may be selected from the group consisting of a portable toilet, a recliner chair, a hardback chair, an armchair, a lounge chair, and a lift chair.

The deck may be movable between two points.

The mobile platform may include an extension portion removably coupled to and extending from an end of the base.

The extension portion may be substantially half the length of the deck.

Implementations of mobile platforms for assisting a person with a physical disability may include a base coupled to a motor, the base including a belt pulley fixedly couple to the base, a belt coupled to the motor and extending from the motor and around the belt pulley, and a trolley coupled to the belt. The mobile platform may also include a deck fixedly coupled to a trolley and a base, the deck including a plurality of rollers coupled to an underside of the deck and a channel in the underside of the deck, wherein the motor is configured to move the deck along the base. The mobile platform may also include a controller coupled with the motor that is configured to direct the motor that moves the deck over the base to a first position to allow a user to access a first seating device and to direct the movement of the deck to a second position different from the first position to allow a user to access a second seating device, wherein the first seating device and the second seating device are configured to rest on an upper surface of the deck and the first seating device and the second seating device are each configured to seat a human.

Implementations of mobile platforms for assisting a person with a physical disability may include one, all, or any of the following:

The belt may be a chain.

The base may include a first outer rail and a second outer rail coupled to two opposing edges of the base.

The base may include a first inner rail and a second inner rail coupled to the base along a length of the belt.

The first seating device and the second seating device may be selected from the group consisting of a portable toilet, a recliner chair, a hardback chair, an armchair, a lounge chair, and a lift chair.

The mobile platform may include an extension portion removably coupled to and extending from an end of the base.

The extension portion may be substantially half the length of the deck.

Implementations of mobile platforms for assisting a person with a physical disability may include a base coupled to a motor, the base including a belt pulley fixedly coupled to the base, an extension portion removably coupled to and extending from an end of the base, a belt coupled to the motor and extending from the motor and around the belt pulley, and a trolley coupled to the belt. The mobile platform may also include a deck fixedly coupled to a trolley and a base, the deck including a plurality of rollers coupled to an underside of the deck and a channel in the underside of the deck, wherein the motor is configured to move the deck along the base. The mobile platform may also include a controller coupled with the motor that is configured to direct the motor that moves the deck over the base to a first position to allow a user to access a first seating device and to direct the movement of the deck to a second position different from the first position to allow a user to access a second seating device, wherein the first seating device and the second seating device are configured to rest on an upper surface of the deck and the first seating device and the second seating device are each configured to seat a human.

Implementations of mobile platforms for assisting a person with a physical disability may include one, all, or any of the following:

The belt may be a chain.

The base may include a first outer rail and a second outer rail coupled to two opposing edges of the base.

The base may include a first inner rail and a second inner rail coupled to the base along a length of the belt.

The first seating device and the second seating device may be selected from the group consisting of a portable toilet, a recliner chair, a hardback chair, an armchair, a lounge chair, and a lift chair.

The extension portion may be substantially half the length of the deck.

The deck may be configured to move along the base between only two points.

The first seating device and the second seating device may be removably attached to the deck.

Implementations of mobile platforms for assisting a person with a physical disability may include a base coupled to a deck and a plurality of rollers coupled to the deck. The deck may be configured to be manually moved over the base to a first position to allow a user to sit on a first seating device resting on the deck and to be manually moved over the deck to a second position different from the first position to allow the user to sit on a second seating device resting on the deck. The mobile platform may also include a braking mechanism coupled to one of the base and the deck, wherein the braking mechanism is configured to secure the deck relative to the base at the first position and to secure the deck relative to the base at the second position. The first seating device and the second seating device may each be configured to seat a human.

Implementations of mobile platforms for assisting a person with a physical disability may include one, all, or any of the following:

The mobile platform may include a movement post coupled to the deck.

The base may further include a first outer rail and a second outer rail coupled to two opposing edges of the base.

The braking mechanism may be configured to secure the deck relative to the base at more locations than the first position and the second position.

The first seating device and the second seating device may be selected from the group consisting of a portable toilet, a recliner chair, a hardback chair, an armchair, a lounge chair, and a lift chair.

The mobile platform may include an extension portion removably coupled to an end of the base.

The extension portion may be substantially half the length of the deck.

The deck may be configured to move along the base between only two points.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is an exploded view of the mobile platform of FIG. 1;

DESCRIPTION

This disclosure, its aspects and implementations, are not limited to the specific components, assembly procedures or method elements disclosed herein. Many additional components, assembly procedures and/or method elements known in the art consistent with the intended mobile platform will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such mobile platforms, and implementing components and methods, consistent with the intended operation and methods.

Figure 1:
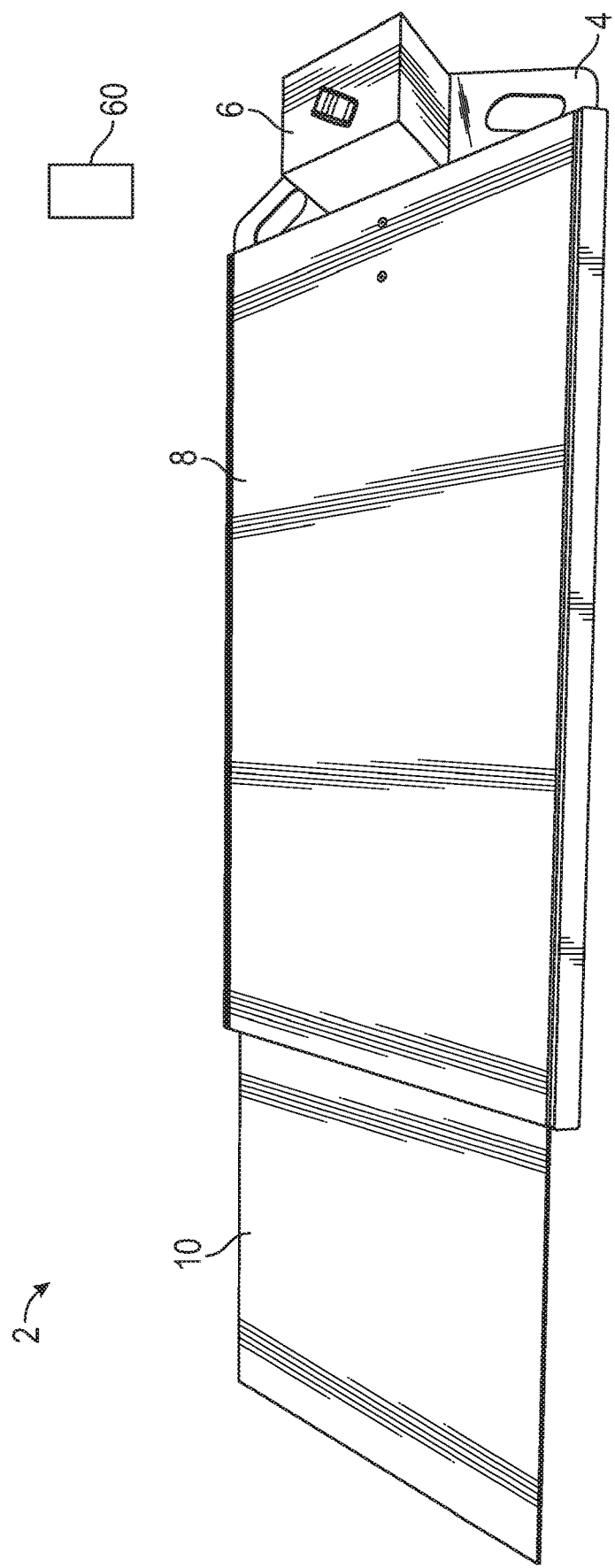
FIG. 1 is a perspective view of a mobile platform.

Referring to FIG. 1, a perspective view of a mobile platform is illustrated. The mobile platform 2 includes a base 4. A motor 6 is coupled to the base and deck 8 is movably coupled to the base 4. In various implementations, an extension portion 10 may also be removably coupled to the base 4.

Referring to FIG. 2, an exploded view of the mobile platform illustrated in FIG. 1 is illustrated. The base 4 coupled to the motor 6, the deck 8, and the extension portion 10 will all be discussed in more detail herein.

Figure 3:
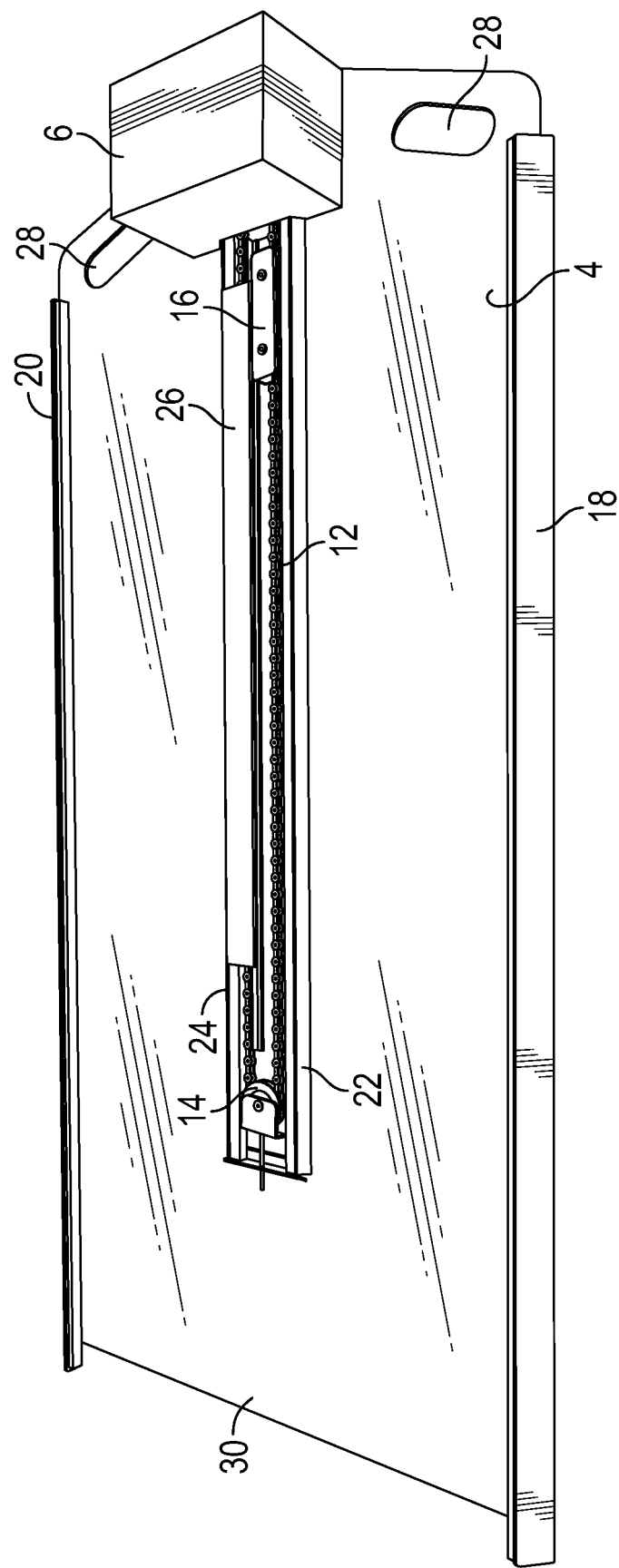
FIG. 3 is a perspective view of a base.

Referring to FIG. 3, a perspective view of a base is illustrated. In various implementations, the base 4 is coupled to a motor 6. The motor 6 may be an electric motor in various implementations. In particular implementations, the motor may be one used for garage door openers.

The motor is coupled to a controller 60. In various implementations, the controller 60 is wireless and wirelessly communicates with the motor 6 over a wireless telecommunication channel (any of a wide variety of radio frequencies or infrared frequencies may be employed), while in other implementations the controller is physically coupled to the motor through a cable containing one or more wires. The controller directs the motor in a manner that moves the deck over or along the base The motor is coupled to a belt 12. In various implementations, the belt may be, by non-limiting example, a chain, a rubber belt, a cable, or any other belt made of synthetic or natural materials. In implementations with a belt, the motor operates to move the belt.

As illustrated, the base 4 includes a belt pulley 14. The belt pulley 14 may be fixedly coupled to a base floor 30. In various implementations, the belt 12 may extend from the motor to the belt pulley, wrap around the belt pulley, and extend back to the motor forming a continuous belt loop.

In various implementations, the belt pulley is coupled on top of a surface of the base floor 30. In other implementations, the belt pulley may be within a cavity in the base floor 30. In the implementation illustrated by FIG. 3, the belt pulley is located toward an end of the base floor 30 and is substantially centered on the base floor 30. In other implementations, the belt pulley may be located in other various positions on the base floor 30.

A trolley 16 may be coupled to the belt. In various implementations the trolley is fixedly coupled to a single portion of the belt. The trolley 16 moves between the motor and the belt pulley following a path of the belt/chain on a single side of the belt loop.

In various implementations, the base 4 may include a first outer rail 18 and a second outer rail 20. The rails may be coupled to two opposing edges of the base 4. The outer rails may assist in keeping a deck correctly positioned on top of the base and prevent the deck from sliding away from the base in an uncontrolled manner.

In various implementations, the base 4 may include a first inner rail 22 and a second inner rail 24 on top of a surface of the base floor 30. The inner rails may serve as a caging for the belt and the belt pulley. The first inner rail 22 and the second inner rail 24 may be coupled to the base along a length of the belt. In implementations where the belt and the belt pulley are located in a cavity of the base floor 30 below the surface of the base 4, the inner rails may be the walls of the cavity.

In various implementations the base may include a belt guide 26. The belt guide 26 may be on one side of the belt loop or on two sides of the belt loop. In implementations where the belt guide 26 is on the same side of the belt loop as the trolley 16, the belt guide is configured to fit over the trolley in order to maintain the trolley's mobility.

In various implementations the base may include one or more handles 28 within the base floor 30. The handles 28 may facilitate transfer of the mobile platform from on location to another in a home or during initial installation.

The base floor 30 may be made from, by non-limiting example, plastic, polycarbonate, metal, wood, or any combination thereof. The base floor may be of various sizes. In one implementation, the base floor 30 is at least as long as the base of two chairs side by side and as wide as the depth of a base of one chair. In another implementation, the base floor 30 is at least as long as the base of three chairs side by side and still as wide as the depth of one chair. In one implementation, the base floor is ⅛ of an inch thick. Other implementations may have a base floor that is thicker or thinner than ⅛ of an inch.

Referring back to FIG. 2, the mobile platform 2 includes a deck 8. The deck 8 has an upper surface 32. The upper surface may have sufficient area to allow at least two chairs to rest on the upper surface 32. In one implementation, the deck is one inch thick, 60 inches long, and 26 inches wide. In other implementations, the deck may be larger or smaller than this. The size of the deck may be determined in part by the size of the chairs/seating devices placed on the deck.

In various implementations the upper surface of the deck may include a non-slip/non-skid surface, coating, or patterned design. In such implementations, the surface assists in securing any chairs or seating devices that are coupled to or resting on the surface of the deck. The deck 8 may be configured to rest upon a base 4. In implementations where the base has outer side rails, the deck 8 may be configured to fit between the outer side rails.

Figure 4:
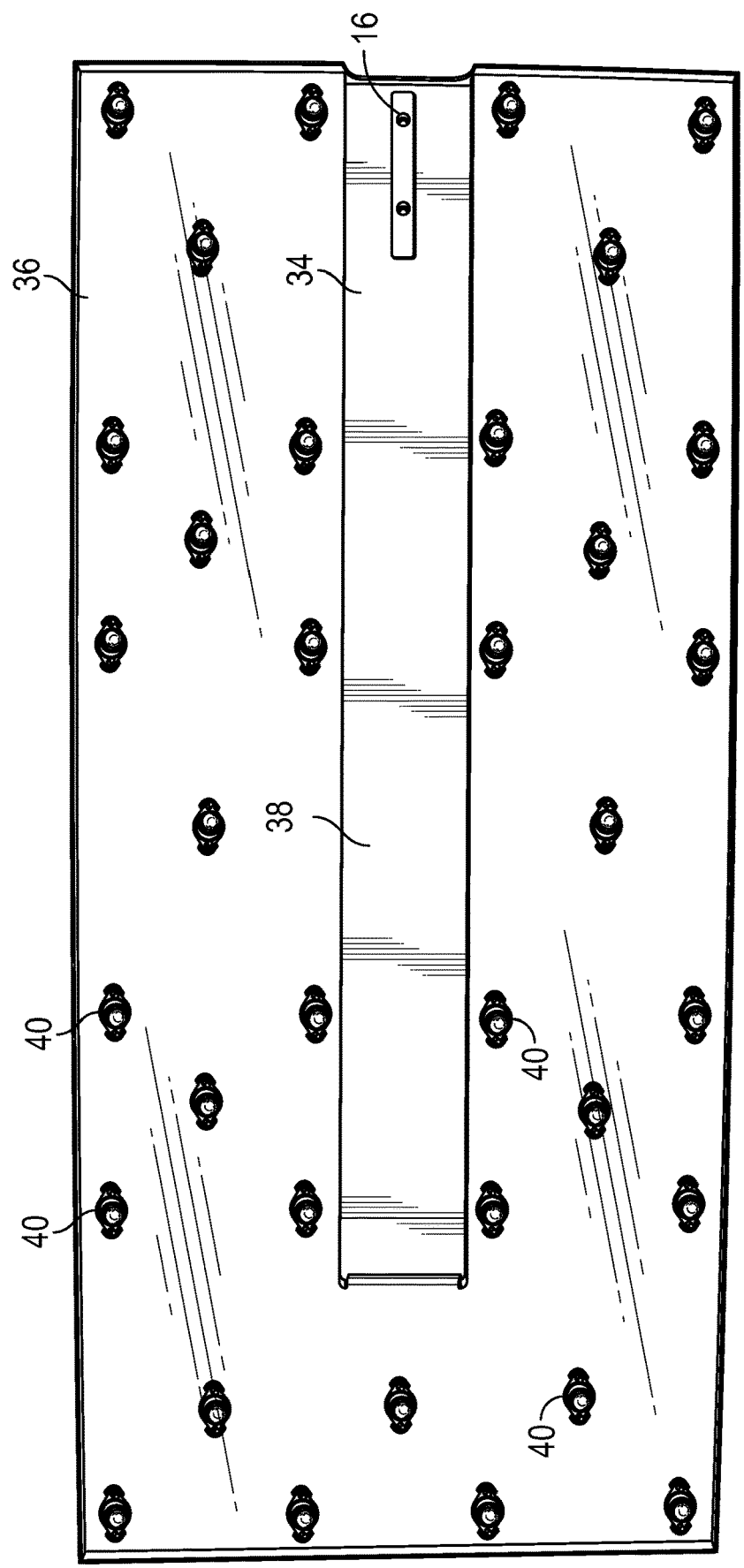
FIG. 4 is a bottom view of a deck.

Referring to FIG. 4, a bottom view of a deck is illustrated. In various implementations, the deck may include a first layer 34 and a second layer 36. Other implementations include only a single layer. In implementations with two layers, the trolley 16 that is coupled to the belt may be fixedly coupled to the first layer 34.

The first layer 34 may be configured to completely cover a face of the second layer 36. In various implementations, the first layer 34 may extend over a face of the second layer 36 and also extend over the sides of the second layer, as is illustrated in FIG. 4. The first layer 34 may be made from, by non-limiting example, plastic, metal, wood, polycarbonate, or any other rigid material.

The second layer 36 may include a channel 38. The channel 38 may be large enough to accommodate a belt, belt pulley, inner rails, and a belt guide. In implementations where the base floor includes a cavity, a channel in the first layer 36 may not be necessary. In implementations where the deck only has a single layer, the deck may have a cavity large enough to accommodate a belt, belt pulley, inner rails, and a belt guide.

In various implementations, the second layer 36 may include a plurality of rollers 40. The plurality of rollers 40 may be balls set in rivets that are coupled to and extend through the second layer. In implementations where a rivet extends through the second layer, the layer may include inset holes prior to the rivet being inserted through the second layer. In other implementations, the plurality of rollers include wheels. The plurality of rollers 40 may extend from the second layer 36 to the base floor.

In other implementations, the base floor may include the plurality of rollers rather than the deck. In implementations where the deck only includes a single layer, the single layer may include the plurality of rollers.

The second layer 36 may be made from, by non-limiting example, polycarbonate, plastic, metal, wood, or any other rigid material. The second layer 36 may be of a variety of sizes and thicknesses. In a particular implementation, the second layer 36 is ⅜ of an inch thick.

In implementations where the deck has a first and a second layer, the first layer 34 may be coupled to the second layer 36 using a coupling mechanism, such as, by non-limiting example, epoxy, glue, nails, bolts, screws, clasps, or any other coupling mechanism. In other implementations, the first layer 34 may rest on the second layer 36 without being fixedly coupled thereto.

Figure 5:
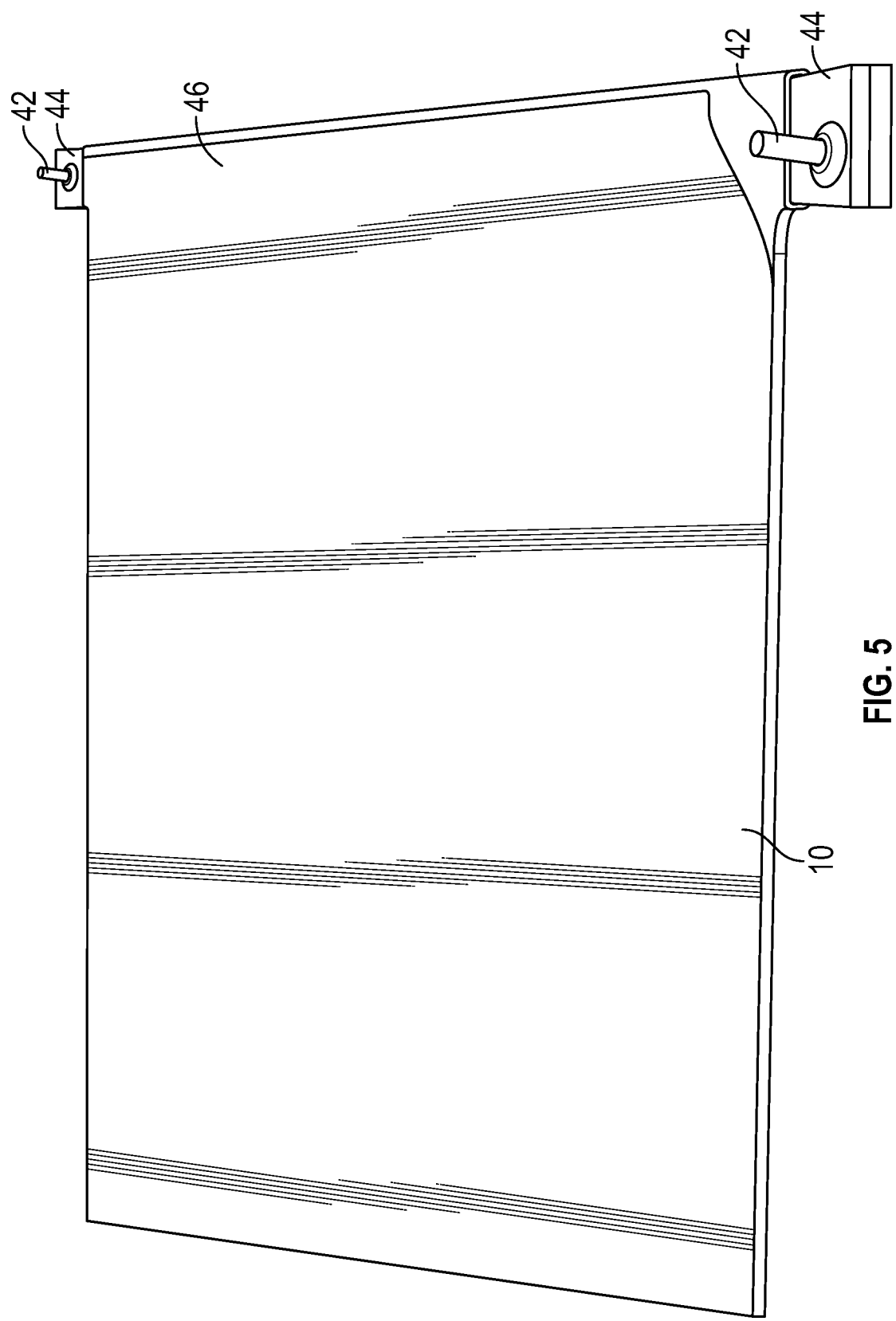
FIG. 5 is a perspective view of an extension portion.

Referring to FIG. 5, a perspective view of an extension portion is illustrated. In various implementations the mobile platform may include an extension portion 10. The extension portion 10 may be wide enough to accommodate the width of the area containing the plurality of rollers in the deck. In other implementations, the extension portion is substantially the same width as the deck. While the extension portion may be of any length, in various implementations the extension portion is substantially half the length of the deck. In implementations where the extensions portion is not as wide as the base, the extension portion may include one or more tabs 44.

The extension portion may be configured to removably couple to an end of the base. In such implementations, the extension portion 10 may include one or more alignment pins 42. The alignment pins may extend from the one or more tabs 44. An end 46 of the extension portion may be configured to slide under the base portion and the alignment pins 42 may be configured to be inserted into one or more corresponding holes in the bottom of the base. In various implementations, the holes may be in the base and extend into the first and second outer rails. In implementations where the extension portion 10 slides under the base, it may extend under the base 1.5 inches. In other implementations, it may extend more or less than this under the base By including an extension portion in the mobile platform, it decreases the required size and weight of the base. This makes transporting/shipping of the mobile platform much easier than if there were no extension portion. The extension portion 10 may be made from any material previously disclosed herein.

Figure 6:
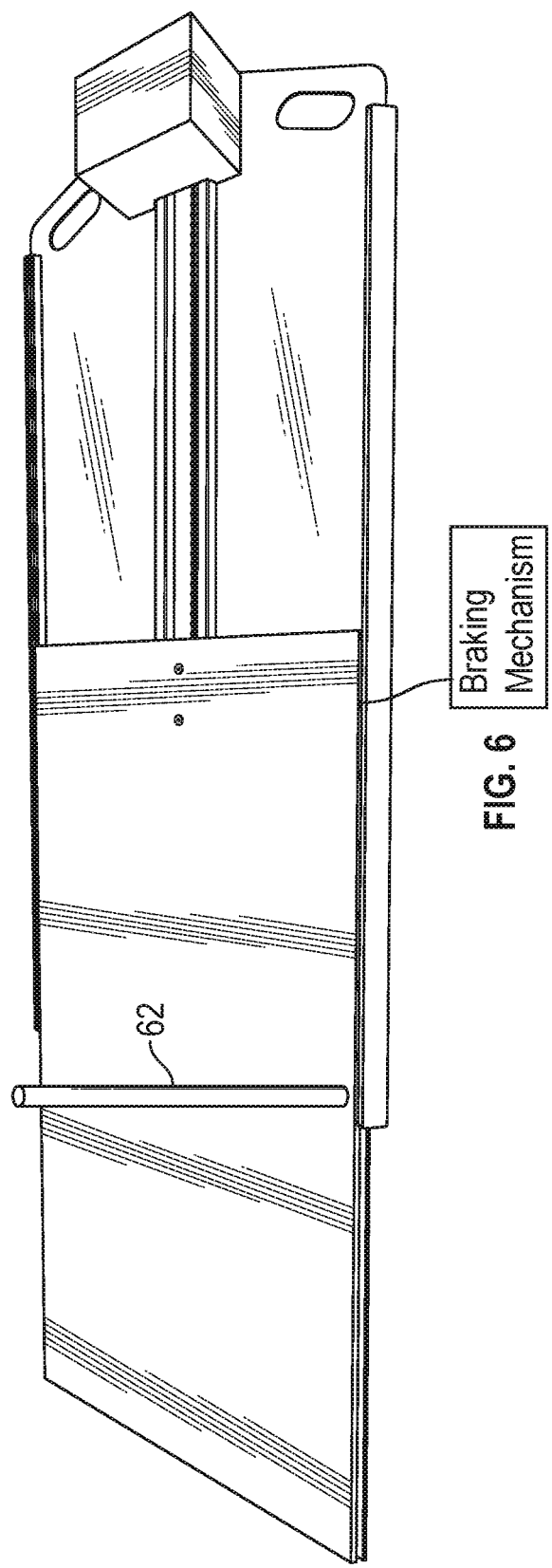
FIG. 6 is a perspective view of a deck coupled to a base with the deck in an extended position.

Referring now to FIG. 6, a perspective view of a deck coupled to a base with the deck in an extended position is illustrated. In various implementations, a controller may be configured to direct the motor to only move the deck between two points, a first point where the deck is near the motor and the second point being where the deck is away from the motor. In other implementations, the controller may be configured to direct the motor to move the deck between any number of points between the motor and the belt pulley. In such implementations, the controller acts to operate the motor while a movement switch is pressed and to turn off the motor when the movement switch is released. In various implementations the various locations of the deck are preset into the controller via calculations of the number of rotations of the motor needed to move the deck to the particular location. In some controller implementations, the controller may contain one or more buttons which, which activated, cause the controller to operate the motor to drive the deck to the preset location.

In various implementations, the motor is not coupled to a belt or chain. In such implementations, the motor may move the deck along the base using a screw drive. In other implementations, a linear motor is used to move the deck relative the base. In still other implementations, a combination of pneumatic or hydraulic cylinders may be used to move the deck back and forth along the base. In implementations with pneumatic or hydraulic cylinders, one cylinder may be used to move the deck in one direction, and a different cylinder may be used to move the deck in an opposite direction.

In various implementations the mobile platform may not include a motor. In such implementations, the deck may be manually moved along the base. The deck may be used by either the user of the mobile platform or another individual not using the mobile platform.

In implementations without a motor, a movement post, such as movement post 62 illustrated by FIG. 6, or support bar may be coupled to the deck surface. The movement post or support bar may allow a user or other individual to move the deck by applying force to the movement post or support bar. In various implementations, the movement post or support bar may extend perpendicularly from the deck. In various implementations there may be more than one movement post or support bar. The one or more movement posts or support bars may be coupled at either end of the deck, the middle of the deck, or any other location of the deck.

In various implementations the mobile platform may include a braking mechanism as shown by black box in FIG. 6. The braking mechanism may secure the deck relative to the base in a first position. The braking mechanism may also secure the deck relative to the base in a second position. In various implementations, the braking mechanism may only secure the deck relative to the base at two positions. In other implementations, the braking mechanism may secure the deck to the base at more than two positions. The braking mechanism may be a handheld braking mechanism configured to be operated by a user. In other implementations it may be an automatic friction braking system that is designed to provide resistance to the movement of the deck and thus act to automatically slow the movement of the deck until it stops.

In various implementations, the braking mechanism may be fixedly coupled to the deck and brake the deck by engaging with the base. In other implementations, the braking mechanism may be fixedly coupled with the base and brake the deck by engaging with the deck.

Figure 7:
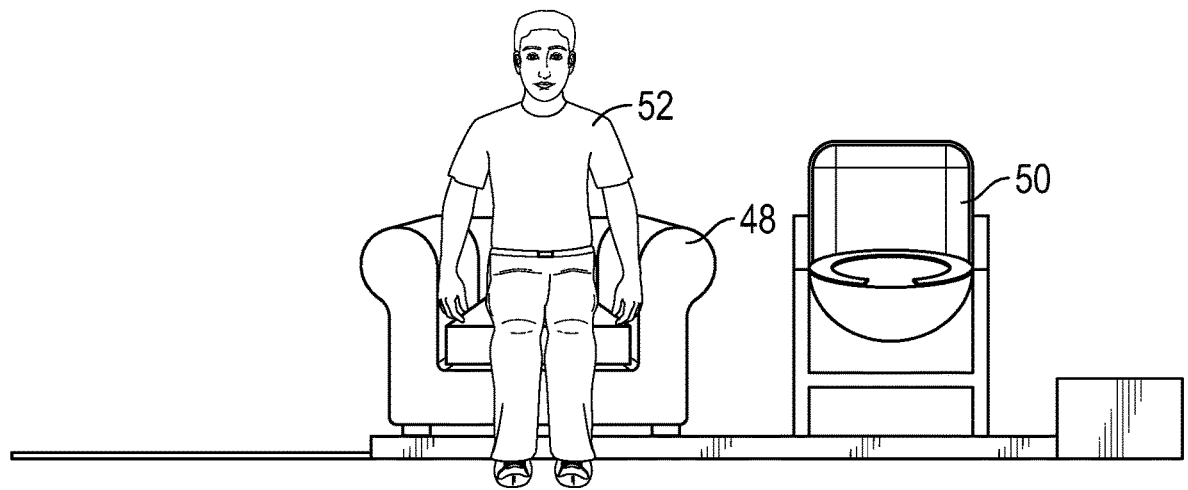
FIG. 7 is a view of a user sitting on a first seating device on a mobile platform in a first position.
Figure 8:
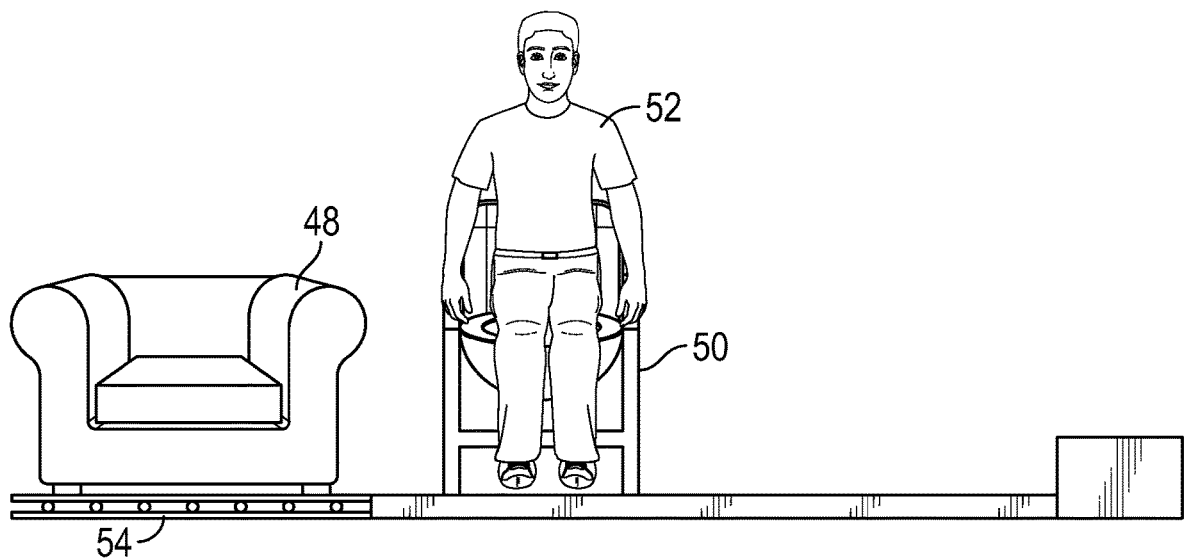
FIG. 8 is a view of a user sitting on a second seating device on a mobile platform in a second position.

Referring to FIGS. 7 and 8, use of the mobile platform with a motor is illustrated. It is understood that a mobile platform without a motor may be operated in a similar manner, with the exception that rather than using a controller and motor to move the deck a user or other individual would apply manual force to the deck to move the deck. Referring specifically to FIG. 7, a view of a user sitting on a first seating device on a mobile platform in a first position is illustrated. The mobile platform may be configured to include a first seating device 48 and a second seating device 50. In various implementations, the mobile platform may include more than two seats (and correspondingly, the deck may move to more than two points). The seats may be, by non-limiting example, a portable toilet, a recliner chair, a hardback chair, a lift chair, an armchair, a lounge chair, or any other seating device. In the implementation illustrated by FIG. 7 and FIG. 8, the first seating device 48 is an armchair and the second seating device 50 is a portable toilet.

In various implementations the first seating device 48 and the second seating device 50 may rest on the upper surface of the deck. In other implementations, the first seating device and the second seating device may be attached to the upper surface of the deck using, by non-limiting example, alignment pins, clasps, clips, straps, or any other attachment mechanism.

A user 52 may sit in the first seating device that is on the deck. User 52 may have a disability that prohibits or restricts their ability to walk on their own but they are still able to stand (either supported or unsupported). When a user 52 wants to sit on the second seating device 50 rather than the first seating device 48, they may stand up (or be helped up) and use the controller to direct the motor to move the deck and the seats on the deck to a second position where the second seating device 50 is under the user 52. The user 52 may then sit down on the second seat. The mobile platform makes it possible for an individual to switch seats by only standing and using a controller to direct a different seat to the position that the first seating device was in. No movement aside from standing up and remaining standing is required. This may be advantageous for individuals who are elderly or ill who, while being able to stand, may be unable to safely walk. Normally such individuals cannot be cared for in a home setting, but usually require nursing home care since they cannot get themselves to the bathroom or the shower. Most homes are not fully wheelchair accessible, and so when an individual no longer can walk, they are moved out of their homes to a nursing care facility. The use of the mobile platform implementations disclosed herein, however, would still allow a person who cannot walk to be cared for in a home setting as the user can use the bathroom and be cared for by a caregiver in both the seated and standing position without having to be able to walk.

Referring to FIG. 8, a view of a user sitting on a second seating device on a mobile platform in a second position is illustrated. In the second position the first seating device 48 is over an extension portion 54. The second seating device 50 is in the position that the first seating device in the first position was in.

In the event that the user 52 would like to go back to the first seat, the user 52 may stand up, use a controller to direct the motor to move the deck and the first seating device back to the first position, and then sit down again.

In places where the description above refers to particular implementations of mobile platforms and implementing components, sub-components, methods and sub-methods, it should be readily apparent that a number of modifications may be made without departing from the spirit thereof and that these implementations, implementing components, sub-components, methods and sub-methods may be applied to other mobile platforms.

What is claimed is:
1. A mobile platform for assisting a person with a physical disability comprising:
 a base coupled to a motor;
 a deck coupled to the base, wherein the motor is configured to move the deck along the base and wherein the deck is configured to hold a first seating device and a second seating device;
 a controller coupled with the motor, the controller configured to direct the motor that moves the deck over the base to a first position to allow a user to sit on the first seating device resting on the deck and to direct the movement of the deck to a second position different from the first position to allow a user to sit on the second seating device resting on the deck; and
 an extension portion removably coupled to an end of the base;

wherein the deck in the second position is extended further from the motor than the deck in the first position.

2. The platform of claim 1, wherein one of the first seating device and the second seating device is selected from the group consisting of a portable toilet, a recliner chair, a hardback chair, an armchair, a lounge chair, and a lift chair.

3. The platform of claim 1, wherein the deck is movable between two points.

4. The platform of claim 1, wherein the extension portion is substantially half the length of the deck.

5. A mobile platform for assisting a person with a physical disability comprising:
   a base coupled to a motor, the base comprising a belt pulley fixedly coupled to the base;
   a belt coupled to the motor and extending from the motor and around the belt pulley;
   a trolley coupled to the belt;
   a deck fixedly coupled to the trolley and to the base, the deck comprising a plurality of rollers coupled to an underside of the deck and a channel in the underside of the deck, wherein the motor is configured to move the deck along the base;
   a controller coupled with the motor, the controller configured to direct the motor to move the deck over the base to a first position to allow a user to access a first seating device and to move the deck to a second position different from the first position to allow a user to access the second seating device; and
   an extension portion removably coupled to an end of the base;
   wherein the first seating device and second seating device are configured to rest on an upper surface of the deck; and
   wherein the first seating device and the second seating device are each configured to seat a human.

6. The platform of claim 5, wherein the belt is a chain.

7. The platform of claim 5, wherein the base further comprises a first outer rail and a second outer rail coupled to two opposing edges of the base.

8. The platform of claim 5, wherein the base further comprises a first inner rail and a second inner rail coupled to the base along a length of the belt.

9. The platform of claim 5, wherein one of the first seating device and the second seating device is selected from the group consisting of a portable toilet, a recliner chair, a hardback chair, an armchair, a lounge chair, and a lift chair.

10. The platform of claim 5, wherein the extension portion is substantially half the length of the deck.

11. A mobile platform for assisting a person with a physical disability comprising:
    a base coupled to a deck;
    a plurality of rollers coupled to the deck, wherein the deck is configured to be manually moved over the base to a first position to allow a user to sit on a first seating device resting on the deck and to be manually moved over the deck to a second position different from the first position to allow the user to sit on a second seating device resting on the deck;
    a braking mechanism coupled to one of the base and the deck, wherein the braking mechanism is configured to secure the deck relative to the base at the first position and to secure the deck relative to the base at the second position; and
    an extension portion removably coupled to an end of the base;
    wherein the first seating device and the second seating device are each configured to seat a human.

12. The platform of claim 11, further comprising a movement post coupled to the deck.

13. The platform of claim 11, wherein the base further comprises a first outer rail and a second outer rail coupled to two opposing edges of the base.

14. The platform of claim 11, wherein the braking mechanism is configured to secure the deck relative to the base at more locations than the first position and the second position.

15. The platform of claim 11, wherein one of the first seating device and the second seating device is selected from the group consisting of a portable toilet, a recliner chair, a hardback chair, an armchair, a lounge chair, and a lift chair.

16. The platform of claim 11, wherein the extension portion is substantially half the length of the deck.

17. The platform of claim 11, wherein the deck is configured to move along the base between only two points.

* * * * *